United States Patent [19]

Alexander

[11] Patent Number: 5,257,349
[45] Date of Patent: Oct. 26, 1993

[54] INTERACTIVE DATA VISUALIZATION WITH SMART OBJECT

[75] Inventor: Joanna R. Alexander, Montgomery Township, Somerset County, N.J.

[73] Assignee: David Sarnoff Research Center, Inc., Princeton, N.J.

[21] Appl. No.: 628,872

[22] Filed: Dec. 18, 1990

[51] Int. Cl.⁵ ............................................. G06F 15/62
[52] U.S. Cl. .................................. 395;159; 395/155; 395/161
[58] Field of Search ............... 395/159, 155, 161, 156, 395/157; 340/706, 747, 750; 382/46, 56

[56] References Cited

U.S. PATENT DOCUMENTS

| | | | |
|---|---|---|---|
| 4,649,499 | 3/1987 | Sutton et al. | 395/159 |
| 4,811,240 | 3/1989 | Ballon et al. | 364/518 |
| 4,813,013 | 3/1989 | Dunn | 364/153 |
| 4,845,644 | 7/1989 | Anthias et al. | 364/521 |
| 4,870,561 | 9/1989 | Love et al. | 364/192 |
| 4,901,221 | 2/1990 | Kodosky | 395/159 |
| 4,926,349 | 5/1990 | Thor | 364/523 |
| 4,999,790 | 3/1991 | Murayama et al. | 395/155 |
| 5,041,992 | 8/1981 | Cunningham et al. | 395/159 |
| 5,072,412 | 12/1991 | Henderson, Jr. et al. | 395/159 |
| 5,081,592 | 1/1992 | Jeng | 364/487 |

*Primary Examiner*—Phu K. Nguyen
*Attorney, Agent, or Firm*—William J. Burke

[57] ABSTRACT

A computer analysis tool enables an operator to analyze and visualize more effectively data objects having a large number of individual physical attributes. In the tool, one or more visual attribute icons are generated on the screen of a display monitor. Each of the visual attribute icons displays values of a sub-set of the total physical attributes of the data objects residing in computer memory in terms of different graphic characteristics. In addition, a physical attribute icon is generated for each of the data objects and may be selectively displayed on the screen of the monitor. Each physical attribute icon identifies all of the physical attributes of its data object available in computer memory. The operator selects from the physical attribute icons, typically with the aid of an input device such as a mouse, the sub-sets of physical attributes to be displayed in the visual attribute icons.

25 Claims, 4 Drawing Sheets

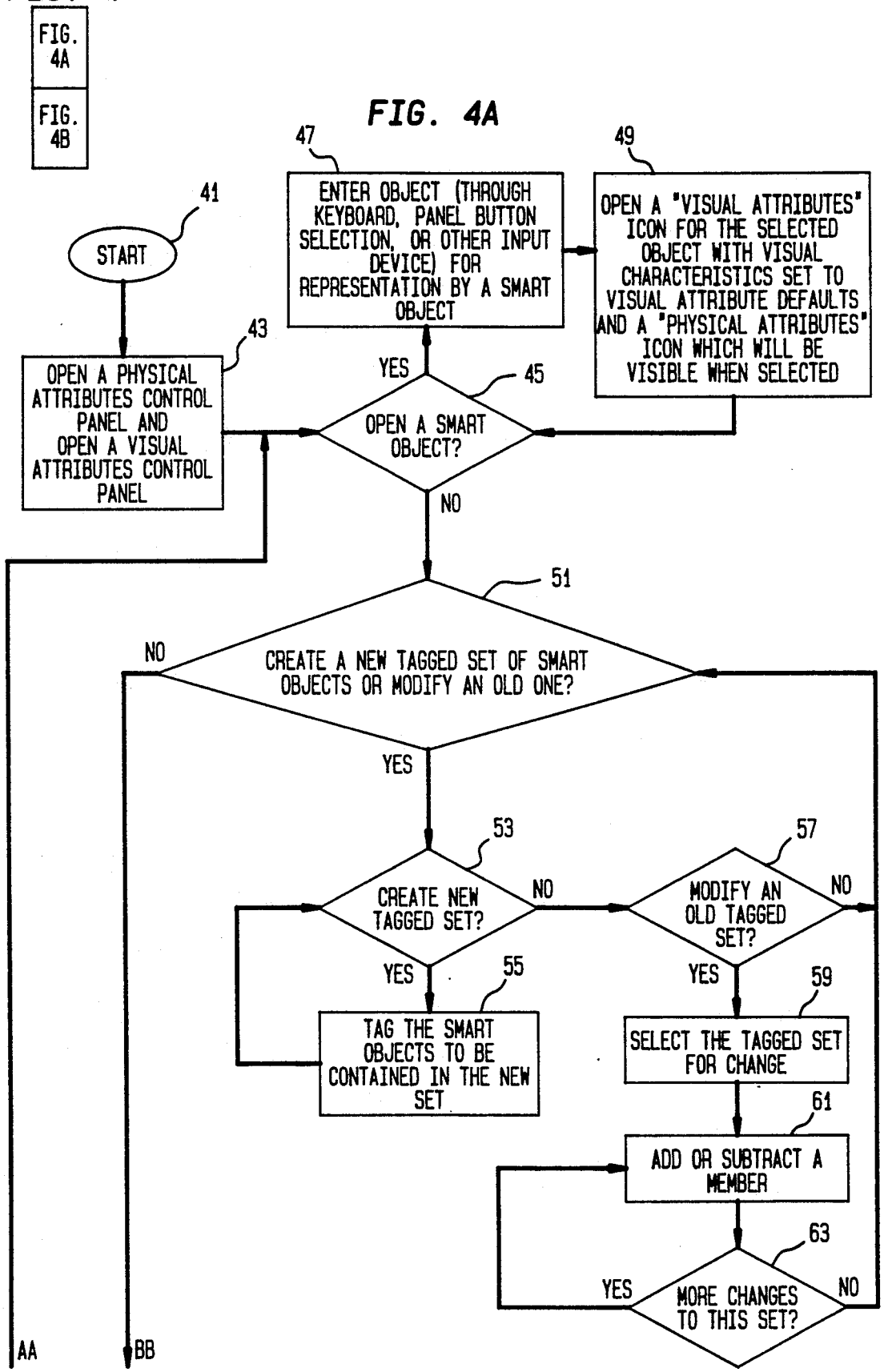

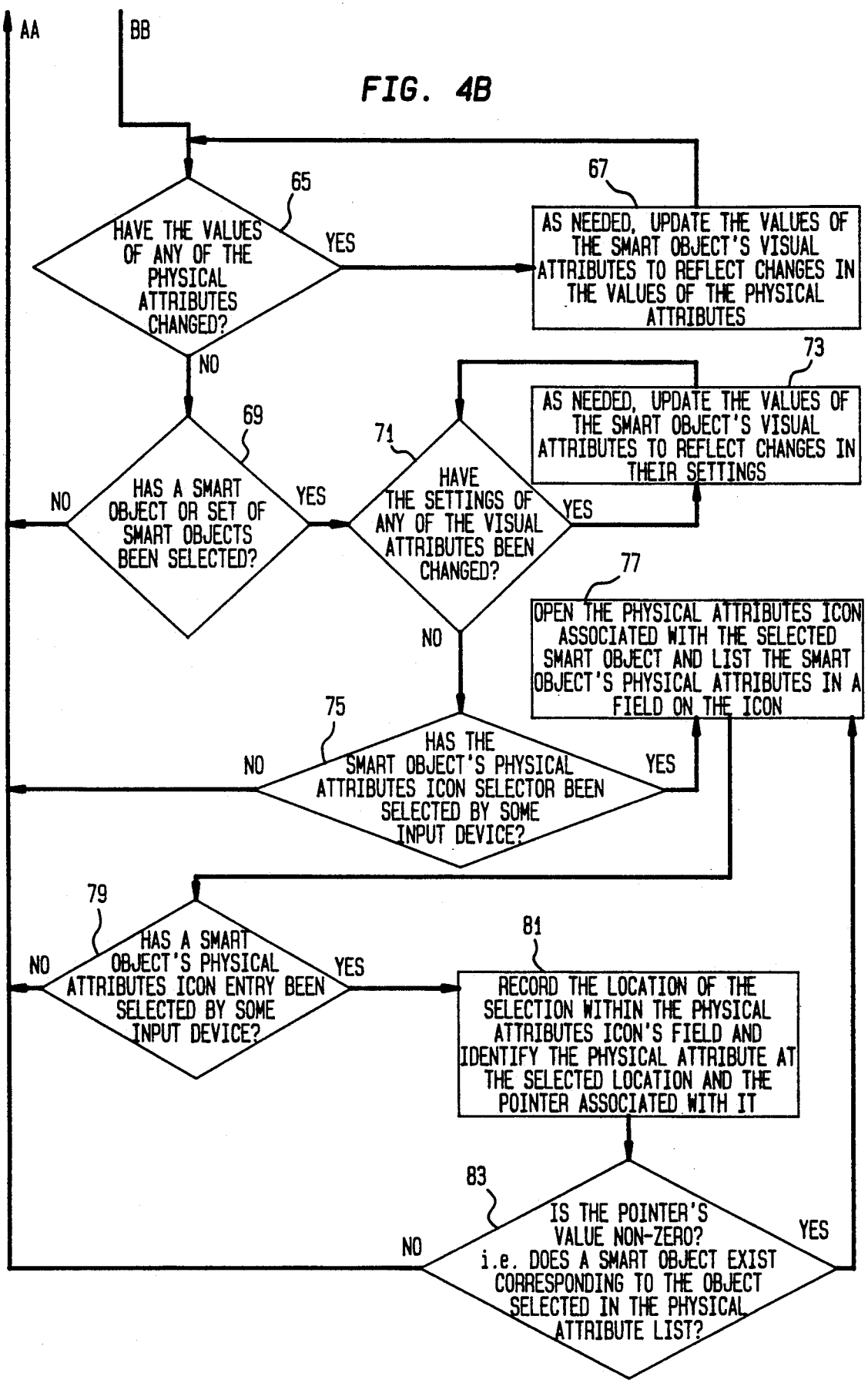

INTERACTIVE DATA VISUALIZATION WITH SMART OBJECT

FIELD OF THE INVENTION

This invention relates generally to the field of computer data analysis and more particularly to methods and arrangements for using a computer and its video display monitor to aid in the visualization of a large number of different physical attributes of one or more data objects.

BACKGROUND OF THE INVENTION

In the analysis and visualization of complex data, a subject about which information is collected in one or more databases in computer memory can be referred to as a data object. There are typically a number of different characteristics or categories of information about one or more data objects about which a human operator may be interested. In the ensuing description, such characteristics or categories will be called "physical attributes" in order to distinguish them from the graphic characteristics of images appearing on the screen of a display monitor, which will be called "visual attributes."

When a large number of different physical attributes of a data object reside in one or more databases in computer memory or are available from many distributed sources, meaningful rapid analysis by a human operator tends to become very difficult. When such an operator is looking for and attempting to identify trends, patterns, or anomalies, visual analysis is often the best approach to take. A principal problem is the great difficulty of displaying more than a relatively small number of individual physical attributes visually at the same time except when the data is quantitative and can be stored in tabular form. Even this method becomes a problem when more than three dimensions of information needs to be displayed. There is a significant need, therefore, for methods of and arrangements for data analysis that afford a better human interface, particularly when the time for detailed analysis is short and speed may be of the essence.

In the past, icons have sometimes been displayed on the screen of a computer monitor to convey information to a human operator about a limited number of a data object's physical attributes at once through such graphic characteristics or visual attributes as shape, size, color, pattern, or location. When the number of physical attributes about which the operator requires information is large, however, such techniques are on only limited use. Either the number of graphic characteristics an icon may assume are likely to be too limited, the totality of the information displayed at any one time is likely to be too complex for ready human analysis, or an assignment of given physical attributes to given visual attributes which may be appropriate for one comparison may be inappropriate for another.

A common application of icons to convey many different types of physical information can be found in modern video arcades. There, in many video games, icons or "sprites" representing people, vehicles, or the like of many different kinds change many facets of their appearance (visible attributes) to indicate their current physical state. A major drawback is that such icons have only predetermined functionality. Even though that functionality may be both diverse and relatively extensive, the fact that it is fixed is a severe limitation upon its use in the analysis of the contents of complex databases.

SUMMARY OF THE INVENTION

The present invention overcomes many of the limitations of the prior art by making the visualization process interactive on the part of a human operator and by using at least two separate icons which may be present on the screen of a computer display monitor contemporaneously and which can be thought of as giving a data object semi-intelligent characteristics. As displayed on the screen of a monitor, the data object may thus be looked upon, in this sense, as a "smart object."

The invention aids an operator, through interactive methods and arrangements, in visualizing a multiplicity of different physical attributes of a data object residing in at least one database in computer memory. Broadly, the invention takes the form of methods and arrangements which comprise generation of a visual attribute icon for a data object on the screen of a display monitor, the visual attribute icon displaying values of a sub-set of the total physical attributes of the data object in terms of different graphic characteristics or visual attributes, generation of a physical attribute icon for the data object and selectively displaying it on the screen of the display monitor, the physical attribute icon identifying all of the physical attributes of the data object available in computer memory as well as links to information about those attributes when they exist, selection from the physical attribute icon of the sub-set of physical attributes to be displayed in the visual attribute icon, assignment of respectively different graphic characteristics or visual attributes to each member of the selected sub-set, and display of the selected values of the sub-set of physical attributes in the visual attribute icon in terms of different visual attributes.

In addition, from another important aspect of the invention, one or more control panels may be generated on the screen of the display monitor showing both the individual physical attributes making up the currently selected sub-set of physical attributes and the graphic characteristics in the visual attribute icon to which they have been assigned. A human operator may thus display a specifically limited sub-set of physical attributes at any one time and change either the identity of the particular physical attributes displayed or the visual attributes by which they are displayed, or both.

The invention is particularly advantageous when physical attributes of a plurality of data objects are being subject to analysis. The human operator may thus compare instantly the status of different data objects and be in a position to identify trends, patterns, or anomalies the exact nature of which might have been impossible to anticipate. From this aspect, the invention takes the form of methods and arrangements which comprise generation of an individual visual attribute icon on the screen of a display monitor for each of the data objects to be examined, the visual attribute icons each displaying values of a sub-set of the total physical attributes of the data objects in terms of different graphic characteristics or visual attributes, generation of a physical attribute icon for each of the data objects, selectively displaying the physical attribute icons on the screen of the display monitor, each of the physical attribute icons identifying all the physical attributes of its data object available in computer memory, selection from the physical attribute icons of the sub-set of physical attributes to be displayed in the visual attribute icons, assignment of respectively different graphic characteristics or visual attributes to each member of the selected sub-set, and display of the values of the selected sub-set of physical attributes in the visual attribute icons in terms of different visual attributes.

In accordance with a further aspect of the invention, one or more control panels may be generated on the screen of the display monitor showing both the individual physical attributes making up the currently selected sub-set of physical attributes and the graphic characteristics in the visual attribute icons to when they have been assigned.

The invention will be better understood from the following more detailed explanation of several specific examples, taken in the light of the accompanying drawing and the appended claims.

BRIEF DESCRIPTION OF THE DRAWING

FIG. 4 shows how FIGS. 4A and 4B are combined to form a single flow chart;

FIG. 4A is part of a flow chart illustrating detailed operation of one implementation of the invention; and FIG. 4B is the remainder of that same flow chart.

DETAILED DESCRIPTION

Figure 1:
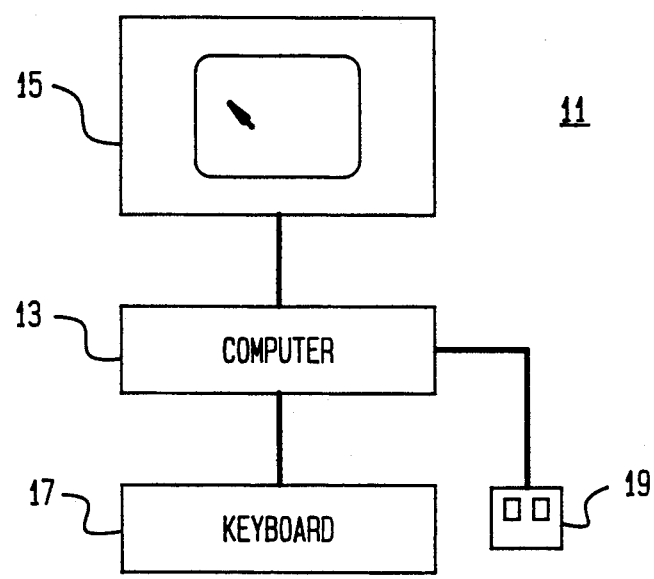
FIG. 1 is a block diagram of a conventional computer assembly of a type to which the invention is readily applicable.

FIG. 1 is a block diagram of a conventional computer assembly 11 of a type to which the invention is readily applicable. In FIG. 1, assembly 11 is made up of a digital computer 13, a video display monitor 15, a keyboard 17, and an input device in the form of a mouse 19. Mouse 19 is a standard tool which, when dragged across a work surface (not shown), moves a cursor on the screen of video monitor 15 and which includes at least two control buttons. The control buttons on mouse 19 can be clicked to inform computer 13 to select functions to be performed, to perform such functions, or to make or move visible marks on the screen of monitor 15. "Click," in this sense, is simply the term normally used in the art to mean depressing a mouse button.

Figure 2:
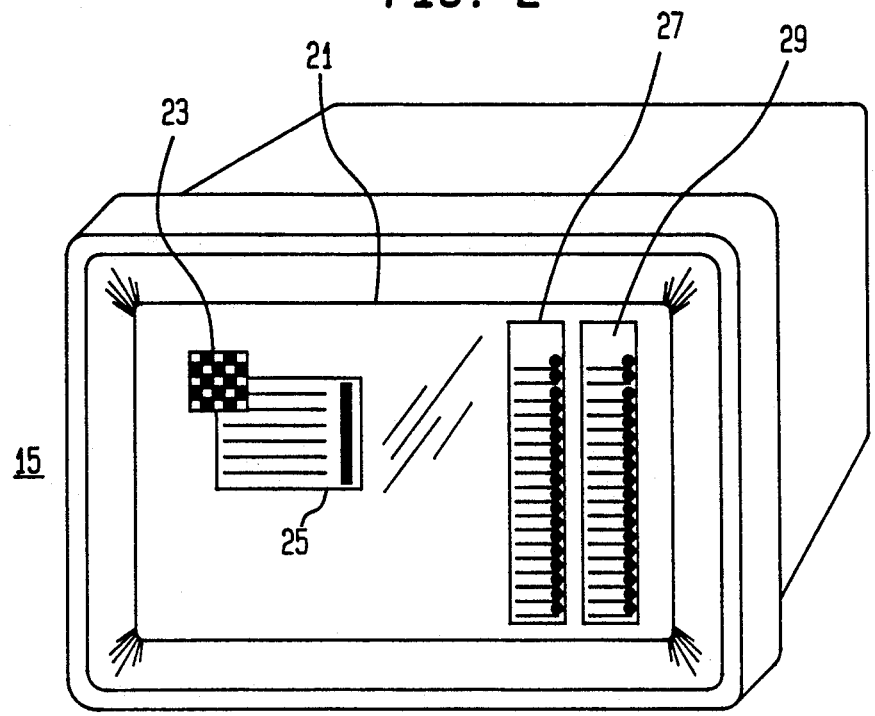
FIG. 2 illustrates the appearance of the screen of a monitor while a single data object is being analyzed with the aid of the invention.

FIG. 2 shows a screen 21 of a video display monitor 15 of the type used in assembly 11 in FIG. 1. FIG. 2 shows a typical appearance of screen 21 when the invention is used in the analysis of a single data object. Displayed on screen 21 are one visual attribute icon 23, a physical attribute icon 25, and two separate control panels 27 and 29. Of the latter, control panel 27 is a visual attribute control panel while control panel 29 is a physical attribute control panel.

When the invention is employed in the analysis of a single data object, the human operator first employs the software installed in the computer to open a "smart object" and generate control panels 27 and 29 and visual attribute icon 23, typically by clicking the mouse at some point on screen 21. For simplicity, visual attribute icon 23 is shown in FIG. 2 as a checkered rectangle. It may, of course, assume any desired form, making use of such specific graphic characteristics or visual attributes as shape, size, color, pattern, or location. It is through such characteristics that visual attribute icon 23 has the ability to display information about some, but not all, of the physical attributes of the data object which can be found in computer memory. If, for example, the data object is one of a fleet of trucks belonging to a trucking company, physical attributes stored in memory may include present location, total capacity of truck, percent of capacity represented by present load, fuel supply, distance from next drop-off point, distance to a proposed new pick-up point, mechanical status of truck, number of hours the driver has been on the road, highway conditions between current location and next drop-off point, driving conditions between next drop-off point and proposed new pick-up point, fuel availability between various drop-off and pick-up points, replacement driver availability, and so on. At least some of these physical attributes may be continually changing with time as up-dated information is supplied to computer memory. In practice, the number of physical attributes considerably exceeds the number of graphic characteristics available to visual attribute icon 23 for its task of providing the operator with visual data.

The operator then uses software in the computer to open a second icon 25 called a physical attribute icon. Again, this may be accomplished by clicking the mouse at a particular location on the screen. Icon 25 differs from icon 23 in that the former displays information about physical attributes in visual graphics from, while the latter identifies all of the physical attributes of the data object residing currently in memory. Such identification may, for example, take the form of a simple listing or, alternatively, a block diagram showing the different physical attributes. When the smart icon is selected for a "visual attribute" change, its physical attributes are automatically fed into physical attribute control panel 29. Then using the mouse, the operator may select as many of the physical attributes from physical attribute control panel 29 as there are visual attributes to assign. With each selection, the operator uses the mouse on control panels 27 and 29 to assign a visual attribute in the visual attribute icon to each physical attribute selected. In the example being discussed, size may be assigned to the physical attribute total capacity and color may be assigned to the physical attribute fuel supply. Additional visual attributes may be assigned and physical attributes selected up to the limits of the number of visual attributes available. Physical attribute icon 25 may be displayed selectively on the screen of the video monitor, appearing only, by way of example, when visual attribute icon 23 is clicked upon with the mouse.

As the operator opens visual attribute and physical attribute icons 23 and 25, as shown in FIG. 2, control panels 27 and 29 are also open, as has already been explained. Control panel 27, by way of example, displays the available visual attributes of icon 23, while control panel 29 displays the selected data object physical attributes. In the instant example, control panel 27 may be given a mark after the listing of the physical attribute size, while control panel 29 may be given a mark after the listing of the physical attribute truck capacity, indicating that size has been assigned to represent truck capacity. Other assignments may be similarly indicated. Alternatively, lines can be drawn between visual attributes in control panel 27 and selected physical attributes in control panel 29 or the order in which physical attributes appear in control panel 27 can be altered to correspond directly to selected visual attributes in control panel 27. Control panels 27 and 29 may, if desired, remain on screen 23 of the video monitor and thus serve to remind the operator of the assignments chosen. Alternatively, they may be presented on the screen only when specified by the operator, either by clicking a mouse or by making an appropriate command line entry.

As a simplified example of how the invention gives the operator maximum flexibility, assume that he or she wishes to retain size to represent total capacity but to use color to represent percent of capacity represented by present load. The mouse is used to select percent of capacity on physical attribute on physical attribute control panel 29 and to select the visual attribute color on visual attribute control panel 27. The color of visual attribute icon 23 then shifts as necessary to provide an accurate representation of the physical attribute as it is found in computer memory.

Figure 3:
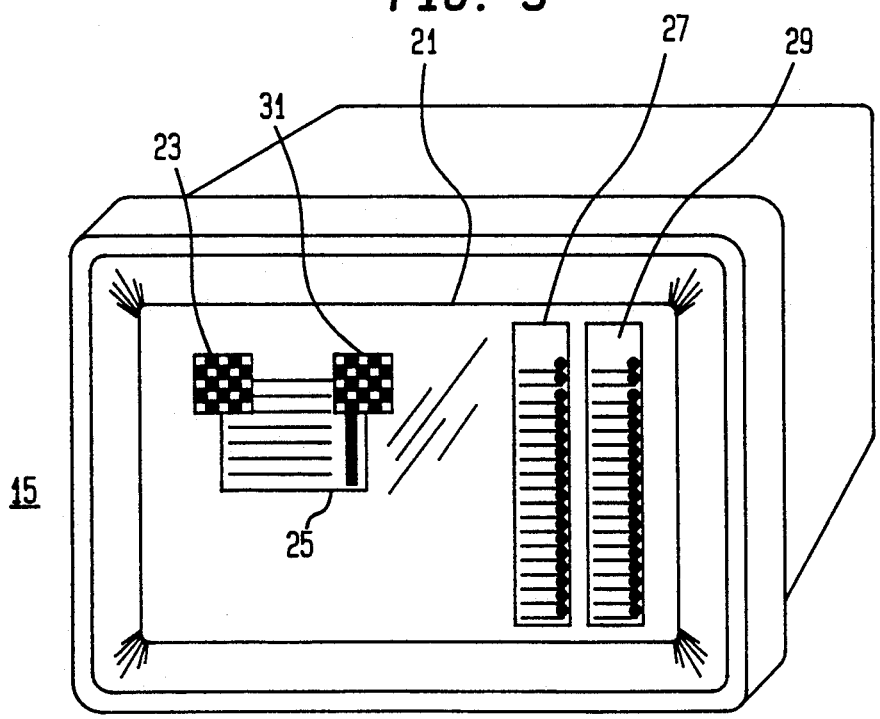
FIG. 3 illustrates the appearance of the screen of a monitor while two data objects are being subjected to analysis at the same time.

FIG. 3 shows a video display monitor 15 which is identical with that shown in FIG. 2 with the exception that in FIG. 3 screen 21 contains a second visual attribute icon 31. Other icons and control panels in FIG. 3 are the same as in FIG. 2 and bear the same reference numerals. Two visual attribute icons 23 and 31 are employed in FIG. 3 to reflect selected physical attributes of two different data objects. To carry forward the example of the trucks, visual attribute icons 23 and 31 in FIG. 3 may represent two different trucks. They may be grouped together, if desired, in order that their assignments of physical attributes to visual attributes may be identical. Even larger numbers of visual attribute icons may be used if it is necessary to display data relating to larger numbers of data objects.

The invention is particularly advantageous when used in the simultaneous analysis of multiple data objects. If screen 21 in FIG. 3 is filled with a substantial number of visual attribute icons simultaneously, the operator can tell at a glance just how each data object compared with every other data object displayed with respect to the physical attributes selected. As the operator searches for trends, patterns, or anomalies, the identity of the selected physical attributes can be changed interactively until an answer is found. Since the operator may not have any way of knowing in advance just what sort of an answer is being sought, the "smart objects" on screen 21 are of major assistance in the decision making process.

By way of further example, assume that the operator desires visual attribute icons 23 and 31 in FIG. 3 to represent unlike data objects. Icon 23 may, for example, represent a truck while icon 31 represents a human driver. Now, it would no longer be appropriate for icons 23 and 31 to be members of the same group. Let the visual attributes selected above remain with respect to the truck, but let size now represent the number of hours the driver has been on the road and color represent the driver's wage rate. In other words, the operator wishes to view people differently from the way in which trucks are being viewed. In this example, the operator may, by way of example, use the mouse to tag one or more data objects (as represented by visual attribute icons) to be included with one set of visual and physical attributes and to tag any other data objects (as represented by visual attribute icons) to be included with another.

The invention may be readily implemented upon computer assembly 11 in FIG. 1 by one skilled in the art by using object oriented programming techniques. The book by Brad J. Cox, "Object Oriented Programming—An Evolutionary Approach," which was published in 1987 by Addison-Wesley of Reading, Massachusetts, is a standard text on the subject and may be referred to for more detailed information.

In general, a "smart object" according to the invention is most easily built from a data object with object-oriented programming tools and appears, in part, as an on-screen icon called a visual attribute icon (e.g., icon 23 in FIG. 2 and icons 23 and 31 in FIG. 3). The other parts of a "smart object" include a list of visual attributes (possible visible states), a list of physical attributes (facts about the thing represented), and links to the computer database or databases.

The visual attribute icon can change its appearance to reflect changes in the underlying data (physical attributes, for example) or user instigated changes. The particular appearance or visual attribute that the on-screen object (as represented by the visual attribute icon) assumes is determined interactively by the user. The user interactively sets links and transformations between the smart object's physical attributes and the visual attributes displayed.

The list of visual attributes (in visual attribute control panel 27 in FIGS. 2 and 3) contains a description of each allowable type of variation in appearance that the on-screen visual attribute icon can assume. Examples are color, position, shape, and size. This list is displayed either continually or when the user wants to change the link or links between the visual attributes and the physical attributes.

The list of physical attributes contains all of the information about the data object (or thing) that is represented by the smart object. This information can be widely varied and may include images, text, or pointers to related information. The user can display this list in the physical attribute icon when needed.

Finally, the information comprising the physical attributes list resides in one or more databases in computer memory. The smart object visual attribute icon (e.g., icon 23 in FIG. 2 and icons 23 and 31 in FIG. 3) contains links to those databases.

The explanation which follows lists six major steps which may be taken in implementing the invention with object oriented programming tools. Of these steps, the order of the first four may vary in accordance with the programmer's preference.

The first step involves using existing graphical and non-graphical database querying tools to collect existing information related to the data object (or thing) in advance, and allowing the system to query for information during the course of the session on a "need-to-know" basis.

The second step builds an object that may be called the physical attribute object. An attribute of the physical attribute object is a text field. The physical attribute object may be hidden or visible on the screen depending on user input (such as clicking with a mouse) to the visual attribute icon. The physical attribute object causes a text field to be displayed for conveying information relating to the data object or thing. With respect to the text field, interaction with it (by clicking with a mouse, for example) selects the clicked text entry (a physical attribute). If the data type of the selected entry contains a pointer to another smart object, one method may use the pointer to locate the address of the smart object and creates a new visual attribute icon to represent it. Another method may simply select the indicated text item. Finally, when text (e.g., a physical attribute) in the text field is selected, the visual attributes list is displayed. The user may set a link or transformation between the selected physical attribute and a visual attribute. This latter action may be achieved, for example, by what is referred to in the art as a "rubber band" connection, by clicking on a button displayed in a control panel, or by clicking on a visual attribute in the visual attributes list. The final action applies the new transformation between the selected physical attribute and the selected visual attribute to the on-screen visual attribute icon.

The third step is to feed the information from the query in the first step into a list that appears in a text field that is an attribute of the physical attribute object.

The fourth step is the building of an object that may be called the visual attribute list. An attribute of the visual attribute list is a list of all allowable visual states of the associated visual attribute icon. This list may be hidden or visible on the screen depending upon user input to the visual attribute icon (either clicking or double-clicking with a mouse, for example). When the visual attribute list is visible, it displays not only the list of possible visual states, but also any existing links between a visual attribute and a physical attribute pair.

The fifth step is to designate default states for the visual attributes of the visual attribute icon and the links between entires in the physical attribute list and entries in the visual attribute list.

The sixth and final step is to build an object on-screen, the visual attribute icon. This object should include a prompt to display its physical attributes list and a prompt to display its visual attributes list. It also needs an ability to be selected or deselected as a member of one or more sets of smart objects. The membership can be represented internally as an array of variable length, where the value of each entry in the array indicates membership in the set represented by that value, or as a binary value in the array whose value indicates inclusion or exclusion in a set represented by that position in the array.

Attributes of this object include an associated physical attribute icon, an associated visual attribute list and a wide range of possible visual attributes or graphic appearances. Initially, the visual attribute icon displays the default states determined in step five. Finally, the object needs a list of sets of smart objects of which the smart object is a member. This list varies as a result of the user selecting some new sets and eliminating old ones.

In an implementation of the invention, two convenient items for continual display for the selected smart object or set of smart objects are control panels containing the list of visual attributes and the list of physical attributes, with the existing links and transformations between pairs of visual attributes and physical attributes indicated. If no smart object or set of smart objects has been selected, the control panels may be blank or contain the values of a default smart object. These control panels may be objects with text field attributes where the text fields are the visual or physical attributes of the selected smart object. In the case of selected sets of smart objects, these panels display the sets resulting from the intersection of the physical attribute lists for all of the smart objects in the selected sets, and the intersection of the visual attribute lists for all of the smart objects in the selected set.

Once the smart objects have been created from data objects by any of the six steps, the system needs rules for altering and updating the smart objects' visual attribute icons. These rules and the order of their execution are shown in a flow chart illustrated in FIGS. 4A and 4B.

FIG. 4 shows how FIGS. 4A and 4B combine with one another through paths AA and BB to form a single flow chart.

The portion of the flow chart shown in FIG. 4A comprises a set of method steps 41, 43, 45, 47, 49, 51, 53, 55, 57, 59, 61, and 63. The first of these, step 41, is labelled "Start" and represents the beginning of the process performed by the underlying software. Step 43 opens both a physical attributes control panel and a visual attributes control panel. The next step, step 45, gives the operator an opportunity to open a smart object based on a data object in one or more of the computer's databases.

As shown in FIG. 4A, step 45 is a decision step. If the answer is "yes", the process moves to step 47, where a data object is entered through the computer keyboard, through a control panel button selection, or through some other appropriate input device for representation by a smart object. The next step, step 49, opens a visual attribute icon for the selected data object with visual characteristics at default settings. From that point, the process loops back to step 45 to give the operator an opportunity to open as many additional smart objects as desired. All such additional smart objects would, or course, be based upon data objects contained in one or more of the computer's databases.

When the operator has decided that no more smart objects are to be opened, the process moves on to step 51, which offers an opportunity to create a new tagged set of smart objects or modify an old set to receive the next user-designated mapping between physical and visual attributes. If the answer in step 51 is "yes", the process moves to step 53, which asks if the operator wishes to create a new tagged set. If the answer in step 53 is "yes", step 55 tags the smart objects to be contained in the new set. If the answer in step 53 is "no", step 57 asks whether the operator wishes to modify an old tagged set. If the answer in step 57 is "no", the process reverts to step 51 as shown.

If, on the other hand, the answer in step 57 is "yes", step 59 selects the tagged set for change and step 61 offers an opportunity either to add or to subtract a member. The next step, step 63, asks whether there are more changes to the selected set. If the answer in step 63 is "yes", the process loops back to step 61, which offers an opportunity either to add or to subtract another member. If the answer in step 63 is "no", the process reverts to step 51 as shown. When the answer in step 51 in FIG. 4A is "no", the process moves along path BB to the portion of the flow chart appearing in FIG. 4B.

The portion of the flow chart appearing in FIG. 4B is made up of another set of method steps 65, 67, 69, 71, 73, 75, 77, 79, 81, and 83. At the upper left hand corner of FIG. 4B, step 65 determines from the underlying database whether the values of any of the physical attributes have changed. If they have, the answer is "yes" and the process moves to step 67. In step 67, the values of the smart object's visual attributes are updated to reflect changes in the values of the physical attributes.

If, in step 65, if is determined that none of the values of any of the physical attributes have changed, the answer is "no" and the process moves to step 69. As shown, step 69 makes inquiry to determine whether or not a smart object or set of smart objects has been selected. If the answer in step 69 is "no", the process follows path AA and reverts to step 45 in FIG. 4A to give the operator another opportunity to open a smart object.

If the answer in step 69 is "yes", the process moves to step 71, which determines whether the settings of any of the visual attributes have been changed. If they have, the answer is "yes" and the process loops through step 73 which, as needed, updates the values of the smart object's visual attributes to reflect changes in their settings. If the answer is "no", the process moves on to step 75.

In step 75, the process determines whether the smart object's physical attributes icon has been selected by some input device (e.g., by clicking a mouse button). If the answer is "no" the process follows path AA and reverts to step 45 in FIG. 4A, giving the operator yet another opportunity to open a smart object. If the answer in step 75 is "yes", the process moves to step 77, in which the physical attributes icon associated with the selected smart object is opened and the smart object's physical attributes are listed in a field on the physical attributes icon. From step 77, the process moves to step 79, which determines whether a smart object's physical attributes icon entry has been selected by some input device (e.g., by clicking a mouse button). If the answer in step 79 is "no", the process follows path AA and reverts to step 45 in FIG. 4A to give the operator an opportunity to do so.

If the answer in step 79 is "yes", the process moves to step 81, which records the location of the selection within the field of the physical attributes icon and identifies the physical attribute at the selected location and with the pointer associated with it. The last step shown is step 83, which determines whether the pointer's value is non-zero. In other words, a determination is made whether a smart object exists corresponding to the object selected in the physical attribute list. If the answer to this final question is "no", the process reverts to step 45 in FIG. 4A. If the answer in step 83 is "yes", the process reverts instead to step 77. The operator may, of course, exit from the process at any stage chosen.

Typical pseudo code, which is an example of at least several different possible approaches and permits one skilled in the art of computer programming to practice the implementation of the invention shown in FIGS. 4A and 4B, is attached hereto as an appendix.

It is to be understood that the embodiments of the invention which have been described are illustrative. Numerous other arrangements and modifications may be readily devised by those skilled in the art without departing from the spirit and scope of the invention.

INTERACTIVE DATA VISUALIZATION WITH SMART OBJECT APPENDIX

```
START
/* Set up the control panels */
Open_physical_attributes_control_panel();
Open_visual_attributes_control_panel();
while (TRUE)   {   /* Run this loop forever */
    /* Call the function that initializes a new
Smart Object */
    while (Smart_object_requested = = TRUE    {
        specify_object();
        open_visual_attributes_icon();
        specify_physical_attributes_icon();
        }  /*  while   */
    /*  Specify a group of Smart Object as a
```

INTERACTIVE DATA VISUALIZATION WITH SMART OBJECT APPENDIX
-continued

```
tagged set    */
    while (Modifying_tagged_status = = TRUE)    {
        if(Create_new_tagged_set = = TRUE)    {
            record_tagged_objects();
            enter_tagged_objects_as_a_set();
            }  /*  if  */
        if(Modify_a_tagged_set = = TRUE)    {
            select_set_to_be_modified();
            for(i=0;i<the number of objects in the
tagged set;i++)    {
                check_object(i,add_or_subtract);
                if(add_or_subtract != 0)    { add_or_subtract_object_from_set(i);
                }  /*  if  */
            }  /*  for  */
        }  /*  if  */
    }  /*  while  */
    /*  Check underlying data for changes  */
    for(i=0;i<the number of Smart Objects;i++)    {
        check_underlying_data_of_Smart_Object(i,changed);
        if(CHANGED)    {    /*  if underlying data
changed, update  */
            for(j=0;j<the number of physical
attributes in Smart Object i's list;j++)    {
                if(physical_attribute[j] = = CHANGED)
{ update_physical_attribute(Smart_Object[i],physical_a
ttribute[j]);
                }  /*  if  */
            }  /*  for  */
            for(j=0;j<the   number   of   visual
attributes;j++)    {
                if(physical_attribute[visual_attribute_j]    = =

CHANGED)    {
    update_visual_attribute(Smart_Object[i],visual_attri
bute_j);
                }  /*  if  */
            }  /*  for  */
        }  /*  if  */
    }  /*  for  */
    /*  See if a Smart Object or set of Smart
Objects is selected  */
    for(i=0;i<the number of tagged sets;i++)    {
        if(tagged_set[i] = = SELECTED)    {
            /*  Update visual attributes of
selected tagged set  */
            for(j=0;j<the   number   of   visual
attributes;j++)    { if(visual_attribute_j_in_tagged_set[i] = = CHANGED)
{
    update_visual_attribute(tagged_set[i],visual_attribu
te_j);
                }  /*  if  */
            }  /*  for  */
        }  /*  if  */
    }  /*  for  */
    for(i=0;i<the number of Smart Objects not contained
in tagged sets;i++)    {
        if(Smart_Object[i] = = SELECTED)    {
            /*  Update   visual   attributes   of
selected Smart Object  */
            for(j=0;j<the   number   of   visual
attributes;j++)    { if(visual_attribute_j_in_Smart_Object[i] = = CHANGED)
{ update_visual_attribute(Smart_Object[i],visual_atrib
ute_j);
                }  /*  if  */
            }  /*  for  */
        }  /*  if  */
    }  /*  for  */
    /*  Open Physical Attributes icon if required
*/
    for(i=0;i<the number of Smart Objects;i++)    {
```

-continued

INTERACTIVE DATA VISUALIZATION WITH SMART OBJECT APPENDIX

```
        if(Smart_Object[i]      ==
PHYSICAL_ATTRIBUTE_LIST_SELECTED)   {
                /*   Display Physical Attributes list
of selected Smart Object    */ display_physical_attribute_list(Smart_Object[i]);
                }  /*   if   */
        /*   See if item in Physical Attributes
list is selected    */
        if(An_entry_in_Smart_Object_i's_Physical_Attribute_l
ist == SELECTED)   { locate_selected_entry_in_physical_attribute_list(Sma
rt_Object[i],entry[j]);
                if(pointer_to(Smart_Object[i],entry[j] ==
ANOTHER_SMART_OBJECT)   {
                /*   Display Physical Attributes
list of linked Smart Object    */ display_physical_attribute_list(pointer_to(Smart_Obj
ect[i],entry[j]));
                {  /*   if   */
                }  /*   if   */
            }  /*   for   */
        }  /*   while   */
```

What is claimed is:

1. An interactive method for visualizing a multiplicity of different physical attributes of a data object residing in at least one database in computer memory, said method comprising the steps of:

generating a visual attribute icon on the screen of a display monitor, said visual attribute icon displaying values of a sub-set of said physical attributes in terms of different graphic characteristics;

generating a physical attribute icon for said data object, said physical attribute icon identifying all of said multiplicity of physical attributes;

displaying said physical attribute icon on the screen of said display monitor;

selecting, from said physical attribute icon, a sub-set of said multiplicity of physical attributes to be displayed in said visual attribute icon;

assigning respectively different graphic characteristics in said visual attribute icon to each member of said selected sub-set; and displaying values of said selected sub-set of physical attributes in said visual attribute icon in accordance with said assigned graphic characteristics.

2. The interactive method of claim 1 further comprising the steps of:

generating a control panel on the screen of said display monitor; and displaying in said control panel both the individual physical attributes making up said selected sub-set and the graphic characteristics in said visual attribute icon which have been assigned to the respective individual physical attributes making up said selected sub-set.

3. The interactive method of claim 1 in which said graphic characteristics include shape.

4. The interactive method of claim 1 in which said graphic characteristics include size.

5. The interactive method of claim 1 in which said graphic characteristics include color.

6. The interactive method of claim 1 in which said graphic characteristics include location.

7. The interactive method of claim 1 in which said graphic characteristics include pattern.

8. In a computer system which includes both a video display monitor and an input device for manipulating a cursor on the screen of said monitor, an interactive method for visualizing a multiplicity of different physical attributes of a data object residing in at least one database in computer memory, said method comprising the steps of:

generating a visual attribute icon on the screen of said display monitor, said visual attribute icon displaying values of a sub-set of said physical attributes in terms of different graphic characteristics;

generating a physical attribute icon for said data object, said physical attribute icon identifying all of said multiplicity of physical attributes;

displaying said physical attribute icon on the screen of said display monitor;

using said input device to select, from said physical attribute icon, a sub-set of said multiplicity of physical attributes to be displayed in said visual attribute icon;

using said input device to assign respectively different graphic characteristics in said visual attribute icon to each member of said selected sub-set; and displaying values of said selected sub-set of physical attributes in said visual attribute icon in accordance with said assigned graphic characteristics.

9. The interactive method of claim 8 further comprising the steps of:

generating a control panel on the screen of said display monitor; and displaying in said control panel both the individual physical attributes making up said selected sub-set and the graphic characteristics in said visual attribute icon which have been assigned to the respective individual physical attributes making up said selected sub-set.

10. An interactive method for visualizing a multiplicity of different physical attributes of a plurality of data objects residing in at least one database in computer memory, said method comprising the steps of:

generating a visual attribute icon on the screen of a display monitor for each of said data objects, each of said visual attribute icons displaying values of a sub-set of said physical attributes in terms of different graphic characteristics;

generating a physical attribute icon for each of said data objects, each of said physical attribute icons identifying for the respective data object all of said multiplicity of physical attributes;

selectively displaying said physical attribute icons on the screen of said display monitor;

selecting, form each of said physical attribute icons, a sub-set of said multiplicity of attributes to be displayed in the respective data object's visual attribute icon;

assigning respectively different graphic characteristics in said visual attribute icons to each member of said selected sub-set; and displaying values of said selected sub-set of attributes in said visual attribute icons in accordance with said assigned graphic characteristics.

11. The interactive method of claim 10 in which at least some of said visual attribute icons are grouped for displaying values of the same sub-set of attributes selected form physical attribute icons.

12. The interactive method of claim 11 further comprising the steps of:
  generating a control panel on the screen of said display monitor; and
  displaying in said control panel both the individual physical attributes making up said selected sub-set and the graphic characteristics in said visual attribute icons to which they have been assigned.

13. In a computer system which includes both a video display monitor and an input device for manipulating a cursor on the screen of said monitor, an interactive method for visualizing a multiplicity of different physical attributes of a plurality of data objects residing in at least one database in computer memory, said method comprising the steps of:
  generating a visual attribute icon on the screen of said display monitor for each of said data objects, said visual attribute icons displaying values of a sub-set of said physical attributes in terms of different graphic characteristics;
  generating a physical attribute icon for each of said data objects, each of said physical attribute icons identifying for the respective data object all of said multiplicity of physical attributes;
  selectively displaying said physical attribute icons on the screen of said display monitor;
  using said input device to select, from each of said physical attribute icons, a sub-set of said multiplicity of physical attributes to be displayed in said visual attribute icons;
  using said input device to assign respectively different graphic characteristics in said visual attribute icons to each member of said selected sub-set; and
  displaying values of said selected sub-set of physical attributes in said visual attribute icons in accordance with said assigned graphic characteristics.

14. The interactive method of claim 13 in which at least some of said visual attribute icons are grouped for displaying values of the same sub-set of attributes selected from physical attribute icons.

15. The interactive method of claim 11 further comprising the steps of:
  generating a control panel on the screen of said display monitor; and
  displaying in said control panel both the individual physical attributes making up said selected sub-set and the graphic characteristics in said visual attribute icons to which they have been assigned to the respective physical attributes making up said selected sub-set.

16. An arrangement for facilitating the visualization of a multiplicity of different physical attributes of a data object residing in at least one database in computer memory, said arrangement comprising:
  means for generating a visual attribute icon on the screen of a display monitor, said visual attribute icon displaying values of a sub-set of said physical attributes in terms of different graphic characteristics;
  means for generating a physical attribute icon on the screen of said display monitor, said physical attribute icon identifying all of said multiplicity of physical attributes;
  means for selecting, from said physical attribute icon, a sub-set of said multiplicity of physical attributes to be displayed in said visual attribute icon;
  means for assigning respectively different graphic characteristics in said visual attribute icon to each member of said selected sub-set; and
  means for displaying values of said selected sub-set of physical attributes in said visual attribute icon in accordance with said assigned graphic characteristics.

17. The arrangement of claim 16 further comprising:
  means for generating a control panel on the screen of said display monitor; and
  means for displaying in said control panel both the individual physical attributes making up said selected sub-set and the graphic characteristics in said visual attribute icon which have been assigned to the respective physical attributes making up said selected sub-set.

18. The arrangement of claim 16 in which said graphic characteristics include shape.

19. The arrangement of claim 16 in which said graphic characteristics include size.

20. The arrangement of claim 16 in which said graphic characteristics include color.

21. The arrangement of claim 16 in which said graphic characteristics include location.

22. The arrangement of claim 16 in which said graphic characteristics include pattern.

23. An arrangement for facilitating the visualization of a multiplicity of different physical attributes of a plurality of data objects residing in at least one database in computer memory, said arrangement comprising:
  means for generating a visual attribute icon on the screen of a display monitor for each of said data objects, said visual attribute icons displaying values of a sub-set of said physical attributes in terms of different graphic characteristics;
  means for generating a physical attribute icon for each of said data objects, each said physical attribute icon identifying for the respective data object all of said multiplicity of physical attributes;
  means for selectively displaying said physical attribute icons on the screen of said display monitor;
  means for selecting, from each of said physical attribute icons, a sub-set of said multiplicity of physical attributes to be displayed in the respective data object's visual attribute icon;
  means for assigning respectively different graphic characteristics in said visual attribute icons to each member of said selected sub-set; and
  means for displaying values of said selected sub-set of physical attributes in said visual attribute icons in accordance with said assigned graphic characteristics.

24. The arrangement of claim 23 further comprising means for grouping at least some of said visual attribute icons for displaying values of the same sub-set of attributes selected form physical attribute icons.

25. The arrangement of claim 23 further comprising:
  means for generating a panel on the screen of said display monitor; and
  means for displaying in said control panel both the individual physical attributes making up said selected sub-set and the graphic characteristics in said visual attribute icons which have been assigned to the respective physical attributes making up said selected sub-set.

* * * * *